United States Patent [19]
Kurashige et al.

[11] Patent Number: 5,148,277
[45] Date of Patent: Sep. 15, 1992

[54] MOSAIC EFFECT GENERATING APPARATUS

[75] Inventors: Masafumi Kurashige, Tokyo; Tetsuya Harada, Kanagawa, both of Japan

[73] Assignee: Sony Corporation, Tokyo, Japan

[21] Appl. No.: 592,254

[22] Filed: Oct. 3, 1990

[30] Foreign Application Priority Data

Oct. 7, 1989 [JP] Japan .................. 1-262760

[51] Int. Cl.$^5$ .................. H04N 9/74; H04N 5/262; H04N 5/272
[52] U.S. Cl. .................. 358/160; 358/22; 358/183
[58] Field of Search .................. 358/22, 160, 183

[56] References Cited

U.S. PATENT DOCUMENTS

| | | | |
|---|---|---|---|
| 4,782,388 | 11/1988 | Lake | 358/160 |
| 4,888,643 | 12/1989 | Kusakabe | 358/183 |
| 4,907,072 | 3/1990 | Narusawa | 358/22 |

FOREIGN PATENT DOCUMENTS 56-044957 4/1981 Japan .................. 358/22
56-046367 4/1981 Japan .................. 358/22

OTHER PUBLICATIONS

"Digital Video Effects", by Masao Inaba, NEC Research & Development, No. 56 Jan. 1980.

Primary Examiner—James J. Groody
Assistant Examiner—Safet Metjahic
Attorney, Agent, or Firm—Alvin Sinderbrand; Wiliam S. Frommer

[57] ABSTRACT

A mosaic effect generating apparatus having at least a single-line memory supplied with an incoming video signal, and supplying as its output a mosaic effect signal a clock signal generating circuit that determines the mosaic width by generating a clock signal of a predetermined frequency and supplying the clock signal to the single-line memory as a write clock signal and a read clock signal and a write control circuit that determines the mosaic height by enabling the incoming video signal to be writtenn in the single-line memory only during selected portions of each horizontal interval of a selected plurality of said successive horizontal intervals of the incoming video signal.

6 Claims, 4 Drawing Sheets

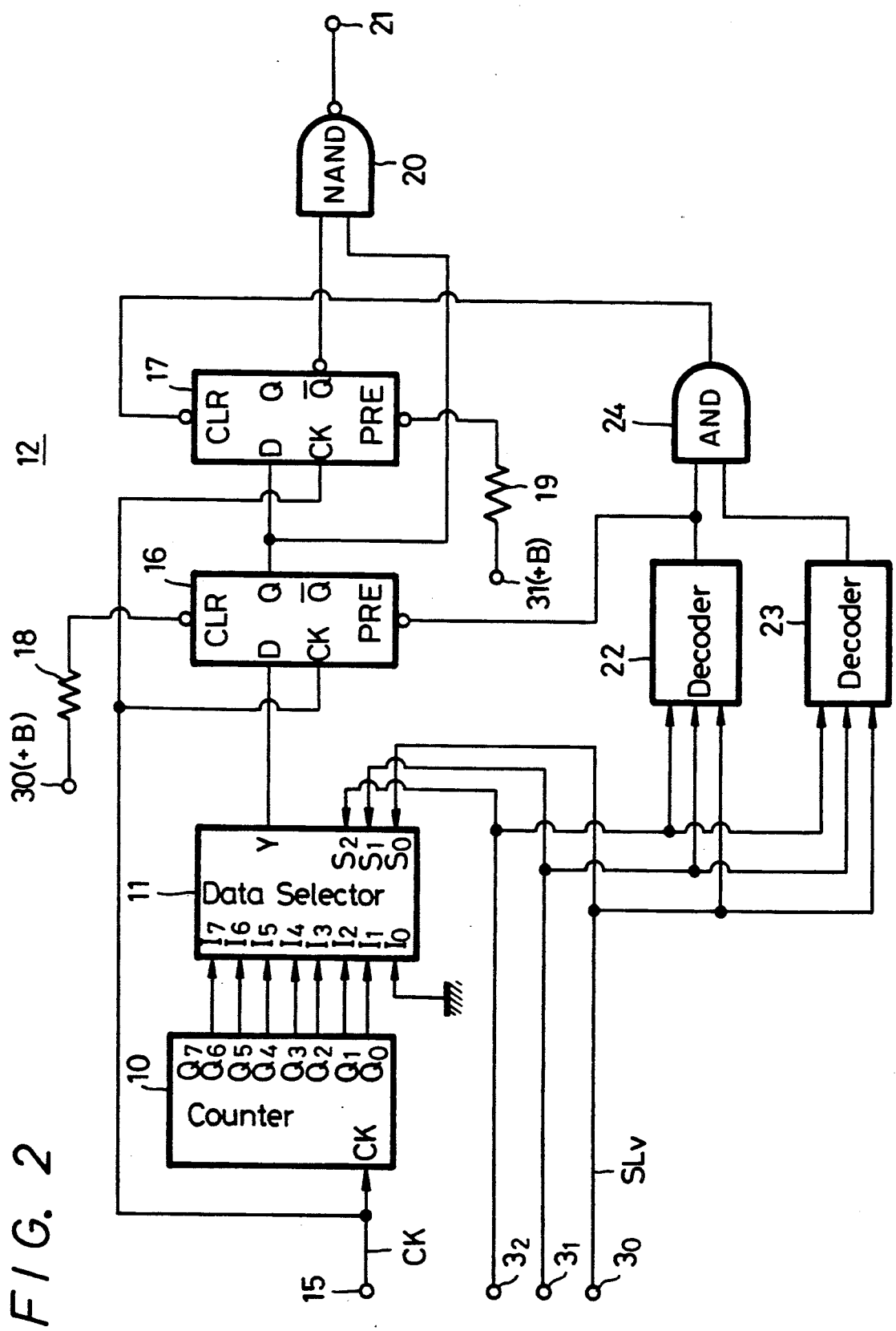
F I G. 2

| S₂ | S₁ | S₀ | Y |
|----|----|----|---|
| 0 | 0 | 0 | $I_0 = 0$ |
| 0 | 0 | 1 | $I_1 = Q_0$ |
| 0 | 1 | 0 | $I_2 = Q_1$ |
| 0 | 1 | 1 | $I_3 = Q_2$ |
| 1 | 0 | 0 | $I_4 = Q_3$ |
| 1 | 0 | 1 | $I_5 = Q_4$ |
| 1 | 1 | 0 | $I_6 = Q_5$ |
| 1 | 1 | 1 | $I_7 = Q_6$ |

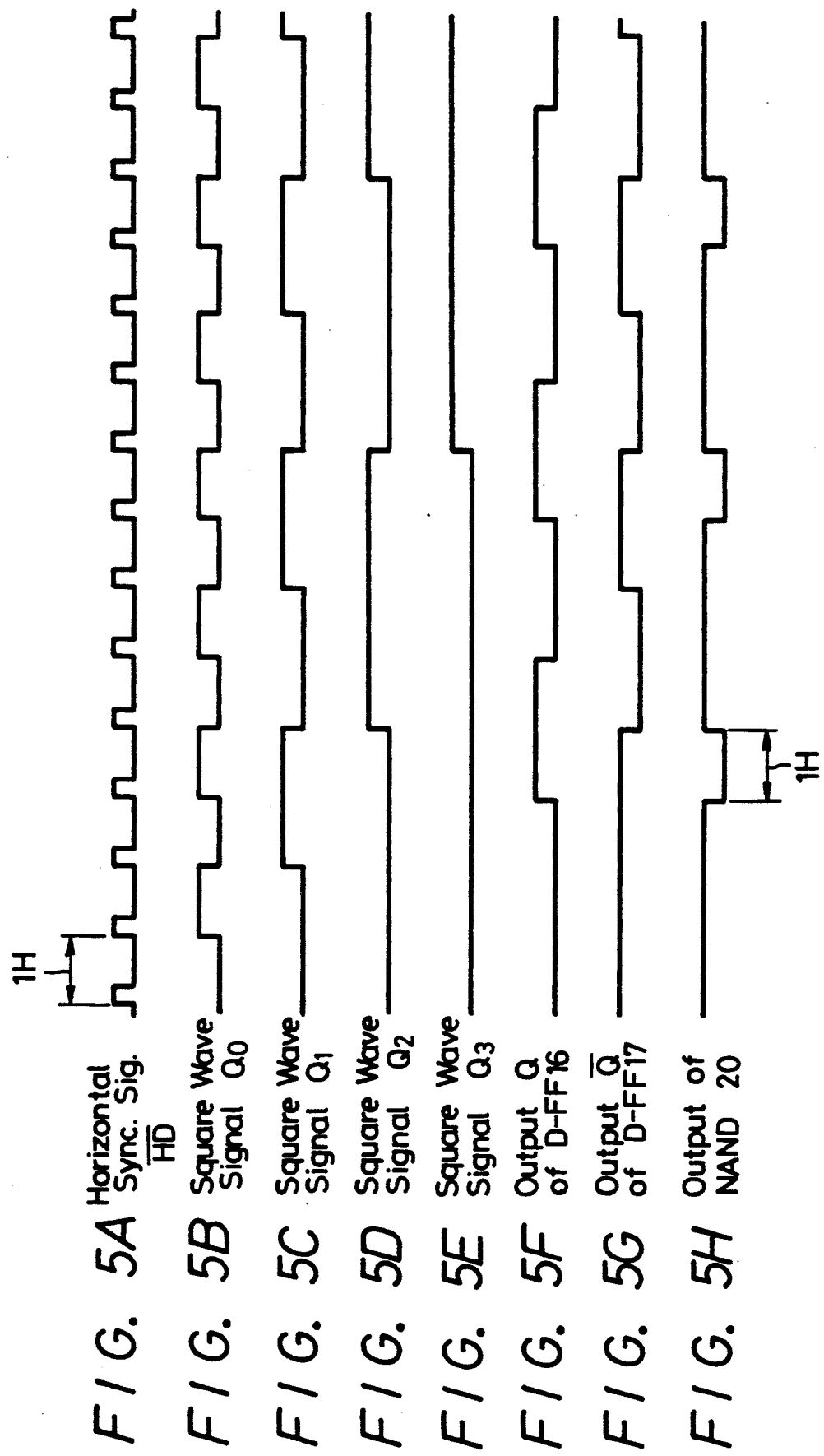

5,148,277

MOSAIC EFFECT GENERATING APPARATUS

BACKGROUND OF THE INVENTION

1. Field of the Invention

The present invention generally relates to mosaic effect generating apparatus and, more particularly, to a mosaic effect generating apparatus which utilizes a one line memory.

2. Description of the Prior Art

U.S. Pat. No. 4,888,643, for example, describes an apparatus for generating a mosaic effect in which when a video signal of one field period is formed of pixel signals of X number in the horizontal direction and of Y number in the vertical direction, that is, pixel signals of $X \times Y$ number, pixel information of adjacent pixel signals of x number ($2 \leq x \leq X$) in the horizontal direction and of y number ($2 \leq y \leq Y$) in the vertical direction, that is, adjacent pixel information in an area of size X by Y pixels becomes the same.

Further, in a conventional mosaic effect generating apparatus utilizing a field memory, a digital video signal of one field period is written in a field memory (i.e., random access memory (RAM)) having addresses of X number in the horizontal direction of the field memory and addresses of Y number in the vertical direction, that is, addresses of $X \times Y$ number, one address is accessed during pixel signals of x number in the horizontal direction and one address is accessed during pixel signals of y number in the vertical direction to read pixel signals stored in the addresses, thereby obtaining a mosaic effect digital video signal.

Such prior-art mosaic effect generating apparatus requires the field memory and an address control circuit for accessing the address such that proper addresses are selected and other addresses are thrown away. Therefore, the conventional mosaic effect generating apparatus is complicated in arrangement and is expensive. Further, the power consumption thereof is large.

OBJECTS AND SUMMARY OF THE INVENTION

Accordingly, it is an object of the present invention to provide an improved mosaic effect generating apparatus which can substantially eliminate the aforenoted shortcomings and disadvantages encountered with the prior art.

More specifically, it is an object of the present invention to provide a mosaic effect generating apparatus which can have a simplified circuit arrangement.

Another object of the present invention is to provide a mosaic effect generating apparatus which can be manufactured at low cost.

A further object of the present invention is to provide a mosaic effect generating apparatus which can be operated at low power.

As an aspect of the present invention, a mosaic effect generating apparatus is comprised of at least a single-line memory means supplied at its input with an incoming video signal and having an output from which a mosaic effect signal can be derived, clock signal generating means for generating a control clock signal of a predetermined frequency and for supplying the control clock signal to each single-line memory means as a write clock signal and read clock signal and a write control means for enabling the incoming video signal to be written in the single-line memory means only during selected portions of each horizontal interval of a selected plurality of said successive horizontal intervals of the incoming video signal.

The preceding, and other objects, features and advantages of the present invention will be apparent in the following detailed description of an illustrative embodiment to be read in conjunction with the accompanying drawings, in which like reference numerals are used to identify the same or similar parts in the several views.

BRIEF DESCRIPTION OF THE DRAWINGS

The accompanying drawings show a preferred embodiment of the invention in which:

FIG. 2 is a block diagram showing in detail a counter, a selector and a pulse width changing circuit used in the mosaic effect generating apparatus of FIG. 1;

FIGS. 5A–5H are timing charts useful in understanding the operation of the mosaic effect generating apparatus shown in FIG. 1, respectively.

DETAILED DESCRIPTION OF THE PREFERRED EMBODIMENT

Figure 1:
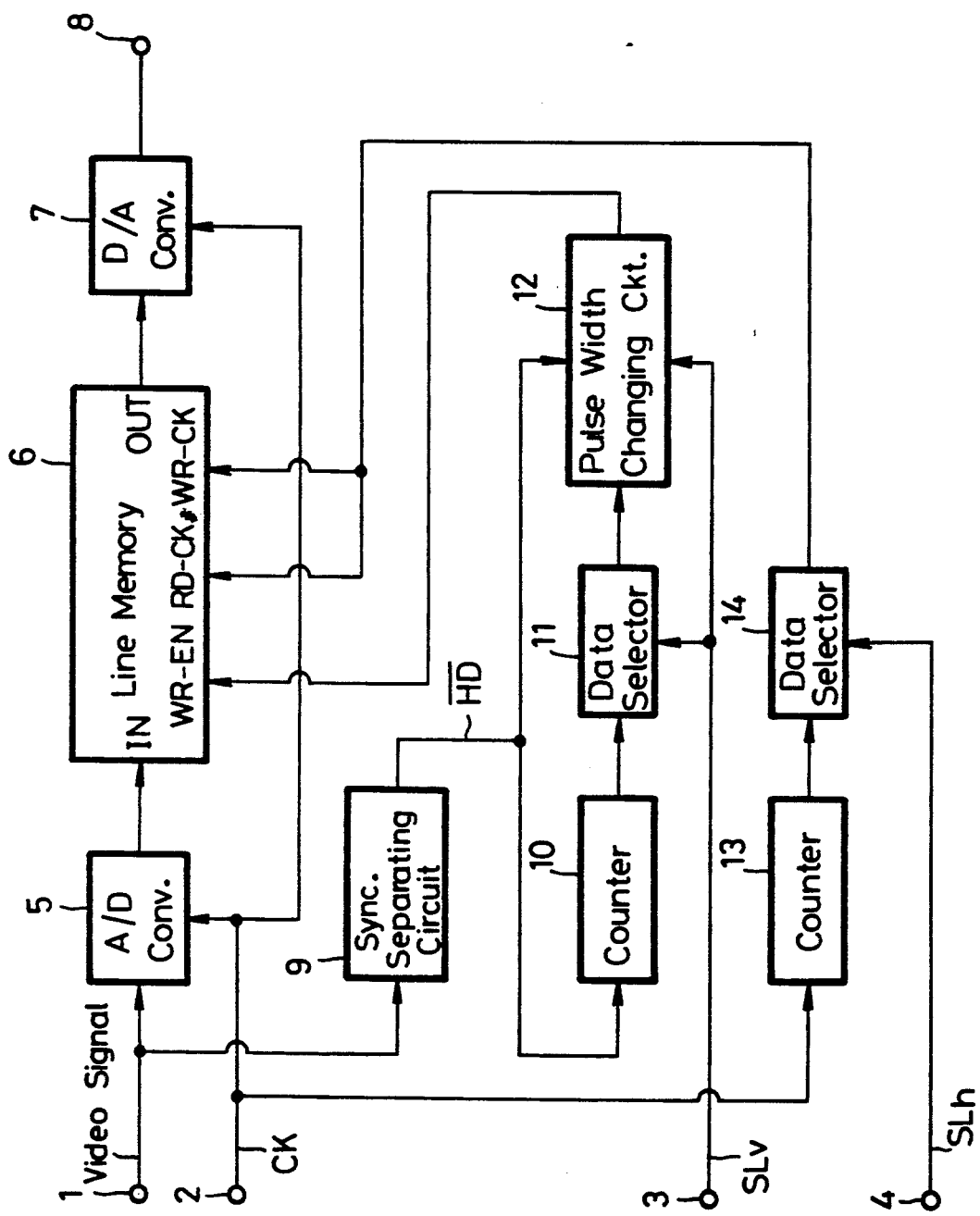
FIG. 1 is a block diagram showing a first embodiment of a mosaic effect generating apparatus according to the present invention.
Figures 3, 4:
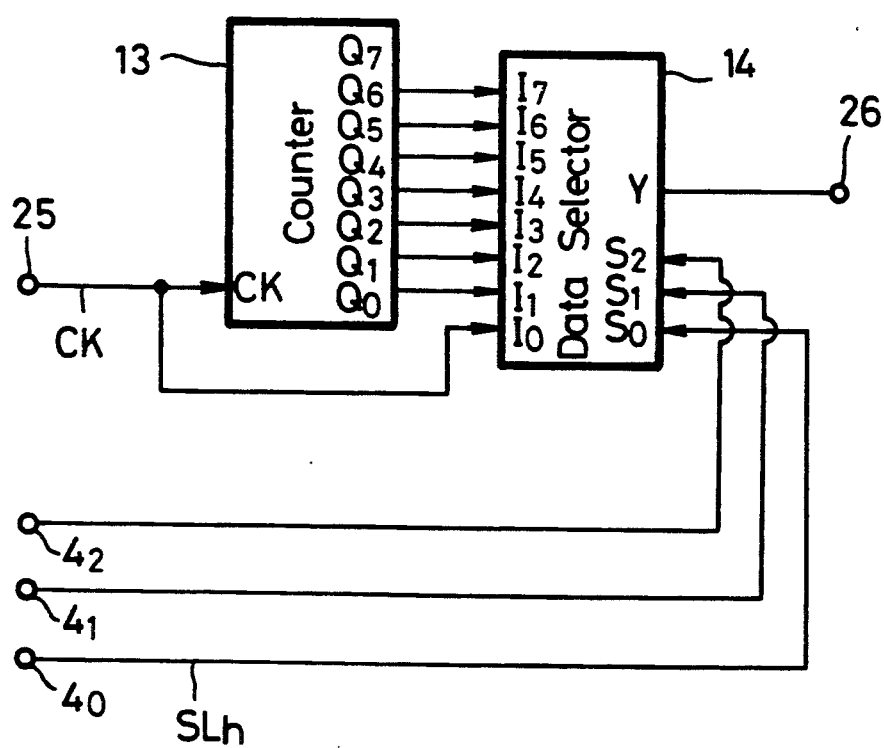
FIG. 3 is a truth table used to explain an operation of the mosaic effect generating apparatus shown in FIG. 1.
FIG. 4 is a block diagram showing in detail another counter and another selector used in the mosaic effect generating apparatus shown in FIG. 1.

The present invention will now be described with reference to the accompanying drawings, in which FIG. 1 shows an overall arrangement of the embodiment of the present invention, FIGS. 2 and 4 show specific examples of one portion of the embodiment, respectively, and FIG. 3 is a truth table used to explain the arrangement of FIG. 2.

With reference to FIG. 1, a video signal applied to an input terminal 1 is supplied to an analog-to-digital (A/D) converting circuit 5, in which it is converted into a digital video signal by a clock signal (i.e., sampling clock signal) CK supplied thereto from an input terminal 2. The frequency of the clock signal CK is, for example, 13.5 MHz. The digital video signal from the A/D converting circuit 5 is written in a line memory 6. The line memory 6 might be a first-in and first-out (FIFO) type line memory and can store a video signal of 1H where H represents one horizontal cycle period. The line memory 6 incorporates therein a read address counter and a write address counter, though not shown. A digital-to-analog (D/A) converter 7 is connected to the line memory 6 and converts a read-out output of the line memory 6 into an analog video signal, and this analog video signal is fed to an output terminal 8. The aforenoted clock signal CK is also supplied to the D/A converting circuit 7.

The video signal applied to the input terminal 1 is supplied to a synchronization separating circuit 9, and a horizontal synchronizing signal $\overline{HD}$ (see FIG. 5A) separated from the video signal by the circuit 9 is supplied to a counter 10 as a clock signal and is thereby counted.

As illustrated more fully in FIG. 2, the counter 10 is formed of, for example, an 8-bit counter and generates square wave signals $Q_0, Q_1, Q_2, ..., Q_7$ which result from dividing the horizontal synchronizing signal $\overline{HD}$ from an input terminal 15 by 2, 4, 8, 16, 32, 64, 128 and 256. Of these square wave signals $Q_0, Q_1, Q_2, ..., Q_7$, only the waveforms of the square wave signals $Q_0, Q_1, Q_2$ and $Q_3$ are illustrated in FIGS. 5B, 5C, 5D and 5E, respectively. Of these square wave signals, seven square wave signals $Q_0, Q_1, ..., Q_6$ are supplied to a data selector 11 as input signals $I_1, I_2, ..., I_7$. An input signal $I_0$ to the data selector 11 is always at "0" (low level). The data selector 11 is also supplied with vertical selecting signals SLv of 3 bits applied to an input terminal 3 (i.e., input terminals $3_0, 3_1$ and $3_2$). FIG. 3 shows a truth table of logic values of these vertical selecting signals $S_0, S_1$ and $S_2$ of 3 bits and corresponding contents of output signals Y selected from the input signals $I_0, I_1, I_2, ...$ Referring back to FIG. 1, the output signal from the data selector 11 is supplied to a pulse width changing circuit 12 and the pulse width thereof is changed to 1H. The pulse width changing circuit 12 is supplied with the horizontal synchronization signal $\overline{HD}$ from the synchronizing separating circuit 9.

As shown in FIG. 2, the pulse width changing circuit 12 is comprised of D flip-flop circuits 16, 17, decoders 22, 23, an AND gate 24 and a NAND gate 20.

The horizontal synchronizing signal $\overline{HD}$ from the input terminal 15 is supplied to clock input terminals of the D flip-flop circuits 16 and 17. The output signal Y from the data selector 11 is supplied to a D-input terminal of the D flip-flop circuit 16. A clear signal input terminal CLR of the D flip-flop circuit 16 is connected through a resistor 18 to a terminal 30 to which a positive voltage +B (e.g., 5 Volts) is applied.

An output Q of the D flip-flop circuit 16 is supplied to a D-input terminal of the D flip-flop circuit 17 of the next stage. A preset input terminal PRE of the D flip-flop circuit 17 is connected through a resistor 19 to a terminal 31 to which a positive voltage +B is applied.

An output Q of the D flip-flop circuit 16 and an output $\overline{Q}$ of the D flip-flop circuit 17 are supplied to the NAND gate 20, and an output terminal 21 is led out from the output side of the NAND gate 20. An output developed at the output terminal 21 is supplied to the line memory 6 as a write enable signal.

The selecting signals $S_0, S_1$ and $S_2$ applied to the input terminal 3 (i.e., input terminals $3_0, 3_1$ and $3_2$) are also supplied to decoders 22 and 23. A decoded output from the decoder 22 is supplied to the preset input terminal PRE of the D flip-flop circuit 16 and to the AND gate 24, while a decoded output from the decoder 23 is supplied to the AND gate 24 whose output is supplied to the clear input terminal CLR of the D flip-flop circuit 17.

The decoded output from the decoder 22 goes to "0" (low level) when the selecting signals $S_1, S_1$ and $S_2$ are placed in a relationship given by the following equality:

$$S_0 = S_1 = S_2 = "0"$$

and the decoded output from the decoder 22 goes "1" (high level) in other cases.

Further, the decoded output from the decoder 23 goes to "0" (low level) when the selecting signals $S_0, S_1$ and $S_2$ establish the following equalities:

$$S_0 = "1" \text{ and } S_1 = S_2 = "0"$$

and the aforementioned decoded output goes "1" (high level) in other cases.

Turning back to FIG. 1, the clock signal CK applied to the input terminal 2 is also supplied to and counted by a counter 13. As shown in FIG. 4, the counter 13 is a counter of, for example, 8 bits and generates square wave signals $Q_0, Q_1, Q_2, ..., Q_7$ which result from dividing the clock signal CK applied to an input terminal 25 by 2, 4, 8, 16, 32, 64, 128 and 256. Of these square wave signals, seven square wave signals $Q_0, Q_1, ..., Q_6$ are supplied to a data selector 14 as input signals $I_1, I_2, ..., I_7$. The input signal $I_0$ of the data selector 14 is the clock signal CK from the input terminal 25. The data selector 14 is supplied with horizontal selecting signals SLh ($S_0, S_1, S_2$) of 3 bits from an input terminal 4 (i.e., input terminals $4_0, 4_1$ and $4_2$). A truth table of logic values of the input horizontal selecting signals $S_0, S_1$ and $S_2$ of 3 bits and corresponding contents of the output signal Y selected from the input signals $I_1, I_1, I_2, ..., I_7$ is similar to that of FIG. 3 but is different only in that, in the truth table of FIG. 3, "$I_0 = 0$" is changed to "$I_0 = CK$".

The output signal Y from the data selector 14 is supplied through an output terminal 26 to the read address counter and to the write address counter incorporated within the line memory 6 of FIG. 1 as read and write clock signals.

An operation of this embodiment will be described with reference to the aforementioned drawings and FIGS. 5A–5H. Let it be assumed that, in FIG. 2, the input signal $I_2 = Q_1$ (see FIG. 5C) is selected by the data selector 11 and this signal is supplied as the output signal Y to the D-input terminal of the D flip-flop circuit 16.

Then, the D flip-flop circuit 16 latches the square wave signal $Q_1$ in response to the leading edge of the horizontal synchronizing signal $\overline{HD}$ (see FIG. 5A) and generates the output Q in which the square wave signal $Q_1$ is delayed by 1H as shown in FIG. 5F.

The output Q from the D flip-flop circuit 16 is supplied to the D-input terminal of the D flip-flop circuit 17 and is thereby latched in response to the leading edge of the horizontal synchronizing signal $\overline{HD}$. The D flip-flop circuit 17 generates the output $\overline{Q}$ in which the square wave signal Q of FIG. 5F is delayed by 1H and is inverted in phase as shown in FIG. 5G.

The output Q of the D flip-flop circuit 16 and the output $\overline{Q}$ of the D flip-flop circuit 17 are supplied to the NAND gate 20, from which there is derived a square wave signal which is generally opposite in phase to the square wave signal $Q_1$ and whose pulse width is 1H as shown in FIG. 5H. This square wave signal is supplied to the write enable terminal WR-EN of the line memory 6 so that the line memory 6 is set in the write enable mode during 1H period at every 4H periods, thus the incoming digital video signal being mosaicked in its vertical direction.

When the data selector 11 is supplied with the selecting signals $S_0 = S_1 = S_2 = 0$, $Y = I_0 = 0$ is selected. At that time, the output of the decoder 22 goes to "0" (low level) and the output of the decoder 23 goes to "1" (high level) so that the output Q of the D flip-flop circuit 16 goes to "1" and the output of the AND gate 24 goes "0", whereby the output $\overline{Q}$ of the D flip-flop circuit 17 also goes to "1" and the output of the NAND gate 20 always goes to "0". That is, the line memory 6 is always set in the write mode and no mosaic effect is produced so that the line memory 6 operates merely as a delay element whose delay time is 1H.

When the data selector 11 is supplied with the selecting signals $S_0 = 1$ and $S_1 = S_2 = 0$, $Y = I_1 = Q_0$ is selected. At that time, the output of the decoder 22 goes to "1" and the output of the decoder 23 goes "0" so that the output of the AND gate 24 goes "0", thereby making the output $\overline{Q}$ of the D flip-flop circuit 17 "1". Thus, the NAND gate 20 generates an output in which the square wave signal $Q_0$ of FIG. 5B is inverted in phase, and the line memory 6 is placed in the writable mode during 1H period at every 2H periods.

When in the data selector 11 the output signal Y is set to one of the input $I_2$ to $I_7$, that is, the outputs $Q_1$ to $Q_6$ of the counter 10, the outputs of the decoders 22 and 23 both go to "1", accordingly, the output of the AND gate 24 goes to "1" so that the D flip-flop circuit 16 is supplied at its preset input terminal PRE with the signal "1" and the D flip-flop circuit 17 is supplied at its clear input terminal CLR with the signal "1". Thus, the D flip-flop circuits 16 and 17 are inhibited from being preset and cleared, respectively.

In response to the horizontal selecting signal SLh supplied to the input terminal 4 (i.e., input terminals $4_0$, $4_1$ and $4_2$), the clock signal CK and one of the outputs $Q_0$ to $Q_6$ of the counter 13 are supplied from the data selector 14 to the read and write address counters of the line memory 6 as the write and read clock signals. Consequently, when the line memory 6 is in the writable mode and is supplied with one of the outputs $Q_0$ to $Q_6$ of the counter 13 as the write and read clock signals, one digital pixel signal of the incoming digital video signal is written in the line memory 6 in response to 2, 4, 8, 16, 32, 64 and 128 clock pulses CK, whereby the incoming digital video signal is mosaicked in its horizontal direction. More precisely, in response to each arrival of 2, 4, 8, 16, 32 and 128 clock pulses CK, the digital pixel signal of the incoming digital video signal is written in the line memory 6 and in response to each arrival of 2, 4, 8, 16, 32, 64 and 128 clock pulses CK, the next digital pixel signal is read out from the line memory 6. Then, the digital pixel signal is held therein while 2, 4, 8, 16, 32, 64 and 128 clock pulses CK are supplied thereto.

Further, when the clock signal CK is supplied unchanged to the line memory 6 as the write and read clock signals, no mosaic effect is produced so that the line memory 6 functions merely as a 1H delay circuit.

While a FIFO memory is utilized as the line memory which stores therein the digital video signal of 1H period in the above-mentioned embodiment, a pair of line memories which store the digital video signal of 1H period and which can not perform the write and read simultaneously may alternatively be provided. In that case, it is preferred that during a certain 1H period one line memory is sued as a write memory and the other line memory is used as a read memory, and during the next 1H period, the former write memory is used as the read memory while the former read memory is now used as the write memory, and this alternation is repeated thereafter.

Furthermore, the vertical selecting signals and the horizontal selecting signals may be chosen so that a mosaic effect is achieved only in a desired region within one frame period.

According to the present invention, as described above, a mosaic effect generating apparatus is obtained, in which the arrangement thereof can be simplified, the manufacturing cost thereof can be reduced and the power consumption thereof can be reduced.

Having described a preferred embodiment of the invention with reference to the accompanying drawings, it is to be understood that the invention is not limited to that precise embodiment and that various changes and modification thereof may be effected by one skilled in the art without departing from the spirit or scope of the novel concepts of the invention as defined in the appended claims.

We claim as our invention:

1. An apparatus for generating a mosaic effect in an incoming video signal composed of successive horizontal line intervals which, as displayed, are vertically aligned comprising:
    at least one single-line memory means constituted by a first-in, first-out (FIFO) memory and having an input for receiving said incoming video signal and an output from which a mosaic effect signal can be derived;
    clock signal generating means supplied with a reference clock signal at a predetermined frequency and which generates a control clock signal having a frequency which is a fraction of said predetermined frequency of said reference clock and for supplying said control clock signal to each said single-line memory means as a write clock signal and a read clock signal; and
    write control means for supplying to each said single-line memory means an enabling signal which enables said incoming video signal to be written in said single-line memory means only during selected portions of each horizontal line interval of a selected plurality of said successive horizontal line intervals of said incoming video signal.

2. An apparatus according to claim 1, wherein said FIFO memory can be simultaneously written into and read from.

3. An apparatus for generating a mosaic effect in an incoming video signal composed of successive horizontal line intervals which, as displayed, are vertically aligned comprising:
    at least one single-line memory means having an input for receiving said incoming video signal and an output from which a mosaic effect signal can be derived;
    clock signal generating means for generating a control clock signal of a predetermined frequency and for supplying said control clock signal to each said single-line memory means as a write clock signal and a read clock signal; and
    write control means for enabling said incoming video signal to be written in said single-line memory means only during selected portions of each horizontal line interval of a selected plurality of said successive horizontal line intervals of said incoming video signal, said write control means including
    separating means for separating a horizontal synchronizing signal from said incoming video signal,
    counting means supplied with said horizontal synchronizing signal and generating a plurality of square wave signals by frequency-dividing said horizontal synchronizing signal by a plurality of predetermined divisors,
    selector means supplied with height data input signals comprising at least one of said plurality of square wave signals and a vertical selecting signal, and which selects, as a selected output signal, one of said height data input signals on the basis of said vertical selecting signal, said selected output signal determining a mosaic height,
    and pulse width changing means supplied with said selected output signal and which forms a control signal supplied to said single-line memory means and which enables writing in said single-line memory means.

4. An apparatus for generating a mosaic effect in an incoming video signal composed of successive horizontal line intervals which, as displayed, are vertically aligned comprising:

at least one single-line memory means having an input for receiving said incoming video signal and an output from which a mosaic effect signal can be derived;

clock signal generating means for generating a control clock signal of a predetermined frequency and for supplying said control clock signal to each said single-line memory means as a write clock signal and a read clock signal, said clock signal generating means including counting means supplied with a reference clock signal and which generates a plurality of square wave signals by frequency-dividing said reference clock signal by a plurality of predetermined divisors, and selector means supplied with width data input signals comprising at least one of said plurality of square wave signals and a horizontal selecting signal, and which selects, as said control clock, signal one of said width data input signals on the basis of said horizontal selecting signal, said control clock signal determining a mosaic width; and write control means for enabling said incoming video signal to be written in said single-line memory means only during selected portions of each horizontal line interval of a selected plurality of said successive horizontal line intervals of said incoming video signal.

5. An apparatus for generating a mosaic effect in an incoming video signal composed of successive horizontal line intervals incoming video signal composed of successive horizontal line intervals which, as displayed, are vertically aligned comprising:

analog-to-digital converting means supplied with said incoming video signal and which converts said incoming video signal into a digital video signal;

at least one single-line memory means having an input for receiving said digital video signal and an output for supplying an output digital video signal;

first counting means supplied with a reference clock signal at a predetermined frequency and which generates a first plurality of square wave signals by frequency-dividing said reference clock signal by a plurality of predetermined first divisors;

first selector means supplied with width data input signals comprising at least one of said first plurality of square wave signals and a horizontal selecting signal and which selects, as a control clock signal determining a mosaic width, one of said width data input signals on the basis of said horizontal selecting signal, and which supplies said control clock signal to each said single-line memory means as a write clock signal and a read clock signal;

separating means for separating a horizontal synchronizing signal from said incoming video signal;

second counting means supplied with said horizontal synchronizing signal and which generates a second plurality of square wave signals by frequency-dividing said horizontal synchronizing signal by a plurality of predetermined second divisors;

second selector means supplied with height data input signals comprising at least one of said second plurality of square wave signals and a vertical selecting signal, and which selects, as a selected output signal determining a mosaic height, one of said height data input signals in response to said vertical selecting signal;

pulse width changing means supplied with said selected output signal and which forms a control signal supplied to said single-line memory means that enables writing of said single-line memory means; and digital-to-analog converting means supplied with said output digital video signal and which converts said output digital video signal into an analog video signal having a mosaic effect.

6. An apparatus according to claim 5, wherein said analog-to-digital converting means and said digital-to-analog converting means are each supplied with said reference clock signal.

* * * * *